Nov. 2, 1937.  J. J. B. LAIR ET AL  2,097,491
TRANSMISSION LINE FOR ELECTRICAL SIGNALING SYSTEMS
Filed Feb. 6, 1932  3 Sheets-Sheet 1
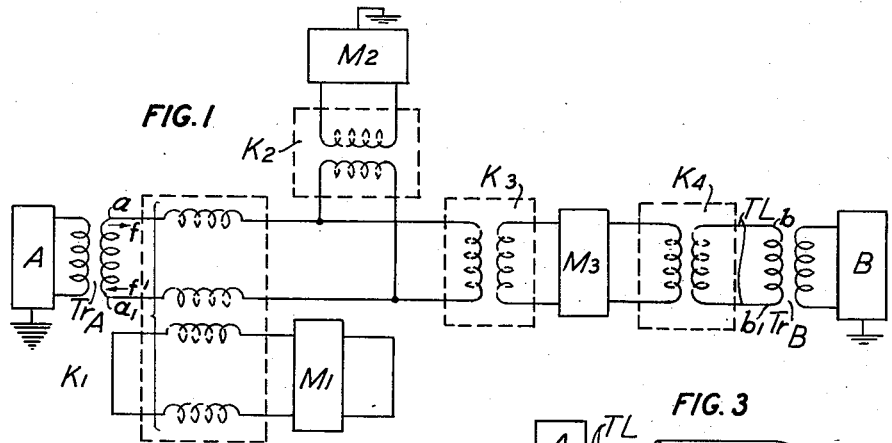
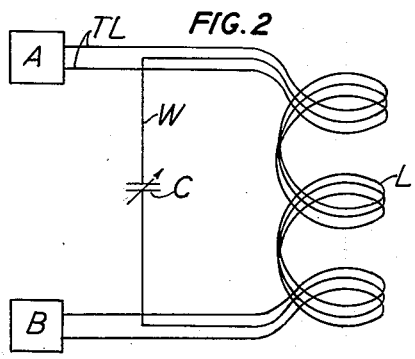
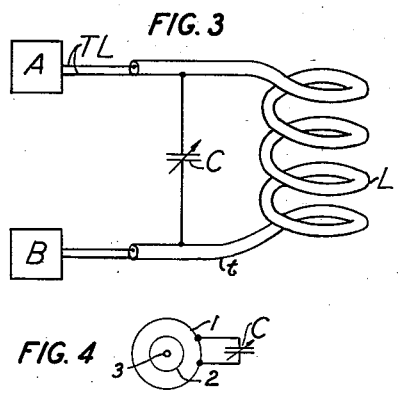
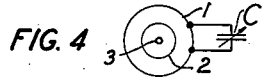
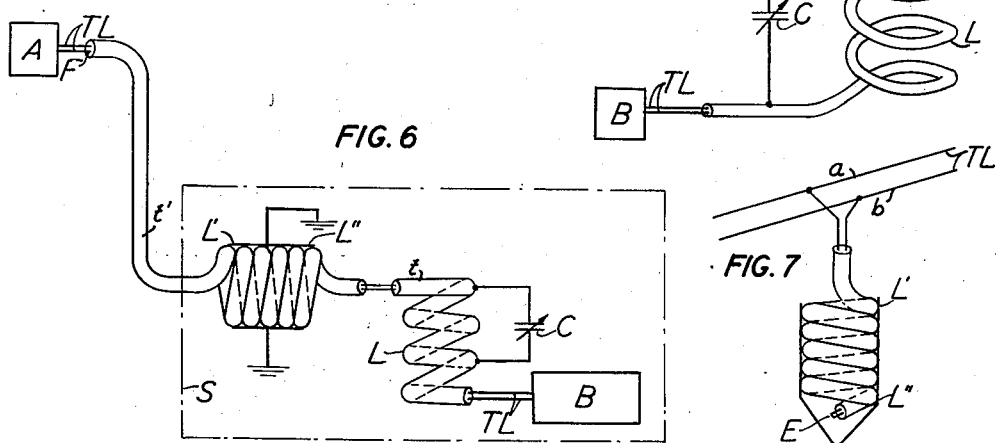
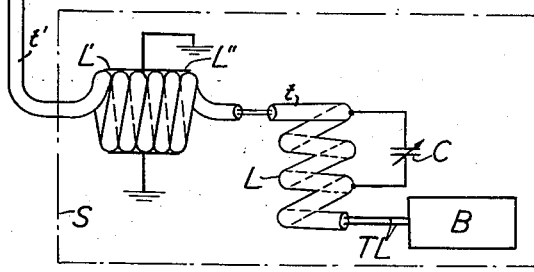
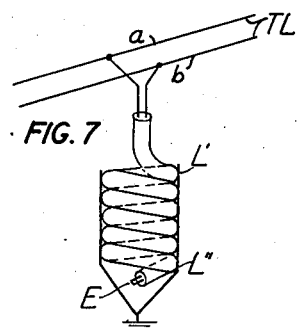
INVENTORS
J. J. B. LAIR
G. E. M. PERROUX
BY E. V. Grigg
ATTORNEY INVENTORS J. J. B. LAIR
G. E. M. PERROUX
BY
E. V. Griggs
ATTORNEY Nov. 2, 1937.  J. J. B. LAIR ET AL  2,097,491
TRANSMISSION LINE FOR ELECTRICAL SIGNALING SYSTEMS
Filed Feb. 6, 1932   3 Sheets-Sheet 3
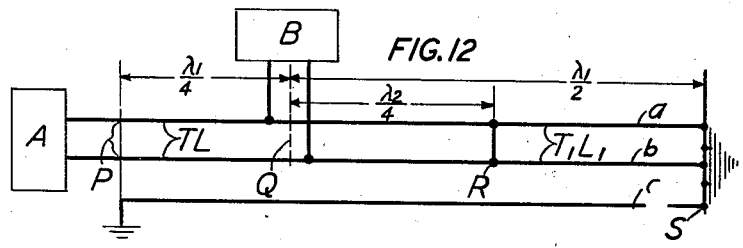
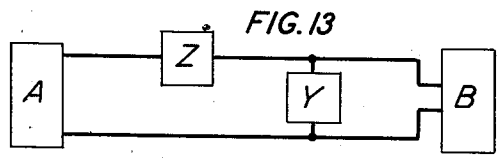
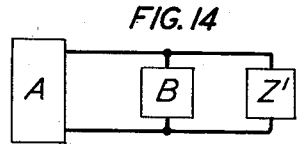
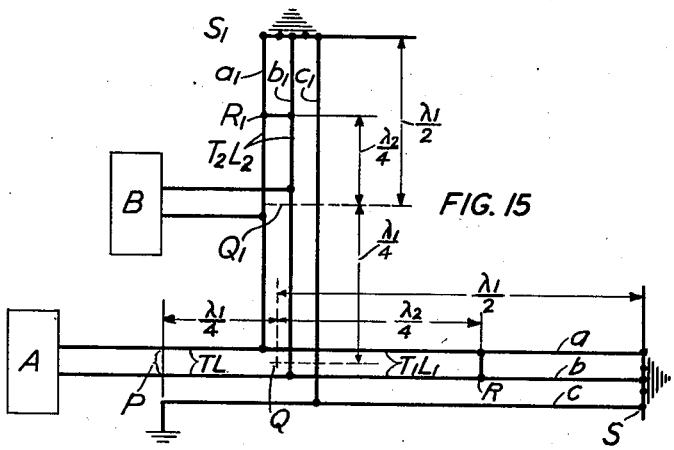
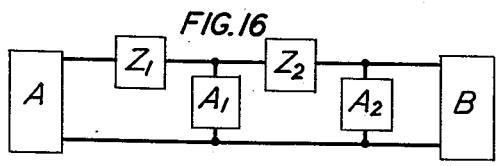
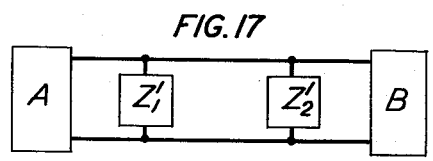
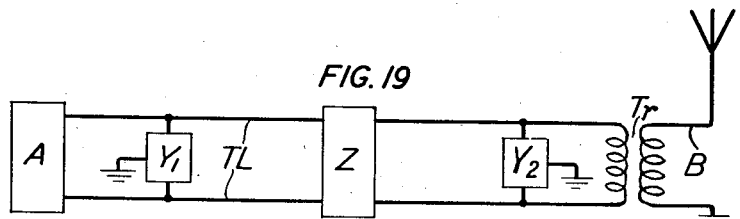
INVENTORS
J. J. B. LAIR
G. E. M. PERROUX
BY
ATTORNEY Patented Nov. 2, 1937

2,097,491

UNITED STATES PATENT OFFICE

2,097,491

TRANSMISSION LINE FOR ELECTRICAL SIGNALING SYSTEMS

Julien J. B. Lair and Georges E. M. Perroux, Paris, France, assignors to Western Electric Company, Incorporated, New York, N. Y., a corporation of New York Application February 6, 1932, Serial No. 591,429
In Great Britain April 1, 1931

14 Claims. (Cl. 250—33)

This invention relates to signaling systems and more particularly to the provision in such systems of means for reducing or eliminating the influence of disturbances such as disturbing currents which may be set up in such signaling systems.

In the prior art various methods or arrangements have been proposed for reducing the effect of disturbances set up in signaling systems. These disturbances comprise mostly longitudinal currents which have the same directions (same phase) in the two wires of the transmission line and spurious circulation currents which have opposite directions in the said wires.

Among the prior suggestions, mention may be made of an arrangement suggested in connection with submarine cables whereby an inductance may be introduced in series in the path of the longitudinal currents set up in the transmission circuit without introducing inductances in the path of the circulation currents. This arrangement is limited to the reduction of the effect of longitudinal currents and does not function to eliminate the effect of the spurious circulation currents.

An object of the present invention is to reduce or eliminate the effect of disturbing currents or spurious oscillations which may be set up in signaling circuits such as, for instance, a transmission line.

Another object of the invention is to attenuate greatly undesired longitudinal currents.

Still another object of the invention is to separate the undesired longitudinal currents and the circulation currents.

According to one feature of the invention there is provided an improved method for reducing extraneous disturbances in a signaling circuit which comprises increasing as much as possible the attenuation offered to disturbing currents without materially increasing the signaling circuit attenuation, said method comprising further associating with and/or inserting in the signaling circuit one or more auxiliary circuits proportioned and arranged with regard to the signaling circuit so as to increase the series impedance and/or the shunt admittance of said signaling circuits for the disturbing currents without materially reacting upon the characteristics of the signaling circuit as regards the circulation currents. The shunt elements and the series elements serving to increase the shunt admittance and series impedance, respectively, for longitudinal currents may be combined so that the extraneous disturbances may be reduced over a predetermined range of frequencies and these elements may comprise distributed or lumped impedances. The auxiliary circuit mentioned above may be associated with or coupled to the signaling circuit in numerous different ways, as for example, electrostatically, electromagnetically, conductively or the like.

Another feature comprises an improved arrangement for reducing the effect of spurious circulation currents which may be set up in a transmission circuit, said arrangement comprising a transmission line constituted by means of a plurality of pairs of wires symmetrically disposed and interconnected so that the spurious circulation currents set up in any conductor of one pair of wires are balanced by the spurious circulation currents set up in the other wire of said pair of wires, thus reducing or eliminating the influence of the spurious circulation currents upon a signaling apparatus connected to the signaling circuit.

The above and other features of the invention will be more readily understood from the following description and the drawings in which like reference characters designate elements of similar function and in which:

Fig. 1 is a schematic diagram used for explaining features of the invention;

Figs. 2, 3, 4 and 5 illustrate by way of example, various ways in which an auxiliary circuit may be associated with a transmission circuit;

Figs. 6 and 7 illustrate arrangements for draining the longitudinal disturbing currents in high frequency transmission circuits;

Fig. 12 illustrates an arrangement utilizing auxiliary high frequency transmission lines;

Figs. 13 and 14 are schematic diagrams used for explaining the arrangement of Fig. 12;

Fig. 15 illustrates another arrangement utilizing high frequency transmission lines;

Figs. 16 and 17 are schematic diagrams used for explaining the arrangement of Fig. 15;

Fig. 19 shows a high frequency directional signaling system embodying features of the invention.

Figure 8:
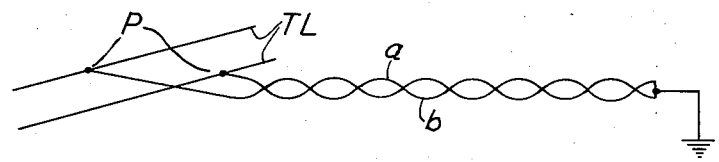
Figs. 8, 9, 10 and 11 illustrate arrangements for reducing the effects of longitudinal disturbing currents utilizing the properties of twisted transmission lines.

Referring now to Fig. 1 there is shown an arrangement in which two devices A and B are connected by means of a transmission circuit TL comprising conductors $a$, $b$ and $a_1$, $b_1$. The apparatus A and B may be of any type whatsoever, for instance, apparatus A may be a transmitter and apparatus B a receiver. Apparatus A may be coupled to the transmission circuit TL by any well known arrangement such as a coupling transformer $Tr_A$ and the apparatus B may likewise be coupled to the transmission circuit TL by a coupling transformer $Tr_B$. The transmission circuit may be constituted of several wires in parallel or of several concentric conductors. Normally, the currents transmitted between the two devices A and B are of the same value in each one of the wires $ab$ and $a_1 b_1$, and in opposite directions as shown by the arrows $f$ and $f'$. However, along its length the transmission line or circuit is subjected to inductive effects from the surrounding medium setting up disturbing longitudinal currents and spurious circulation currents in the transmission line, the circuit for the longitudinal currents comprising both wires of the transmission line in parallel and an impedance path to ground through the apparatus A and B. The circuit for spurious circulation currents may be the same as that of the signaling currents.

It is apparent that if no special precaution is taken the above mentioned disturbing currents will influence the apparatus A and B.

In accordance with this invention, however, auxiliary circuits are associated with the transmission circuit TL so as to reduce the effect upon the terminal apparatus A and B of disturbing currents existing in the transmission circuit TL. Thus, an auxiliary circuit $M_1$ is associated with the transmission circuit TL by means of a coupling device $K_1$ which is illustrated as an inductive coupling device, but which of course may be any other type of coupling device. The coupling between the transmission circuit TL and the auxiliary circuit $M_1$ may be adjustable. As will be seen later in connection with the other figures of the drawings, it is possible to proportion and to arrange the circuit $M_1$ with regard to the transmission circuit TL so that the combination of the two constitutes a path having a high impedance for longitudinal currents while substantially not affecting the transmission characteristics of the circuit TL for the circulation currents.

Another auxiliary circuit is associated in shunt between the wires of the transmission line TL as shown in $M_2$, Fig. 1, by means of a suitable coupling device $K_2$ which similarly may be of any suitable type and which may also be adjustable. This auxiliary circuit $M_2$ is arranged to constitute a path having a high admittance for longitudinal currents without substantially affecting the transmission characteristics of the transmission line TL as regards the signaling currents and it is connected to ground as shown in Fig. 1, so as to drain to earth the said longitudinal currents. Still another auxiliary circuit $M_3$ may be inserted in series in the transmission circuit TL, this auxiliary circuit being coupled to the transmission circuit TL by means of suitable coupling devices $K_3$ and $K_4$. The auxiliary circuit $M_3$ is arranged to constitute a high impedance path for longitudinal currents without materially affecting the characteristics of the transmission circuit TL as regards the signaling currents.

The auxiliary circuits $M_1$ and $M_3$ will be called hereafter "series elements" whereas the auxiliary circuit $M_2$ will be called "shunt element". Since the effect of the above mentioned auxiliary circuits may be selective in frequency, it is often desirable to proportion the series and shunt elements in such a way that the arrangement operates as a "discriminator" for longitudinal currents and circulation currents over a predetermined frequency range.

In addition to the above, the transmission circuit TL is protected against spurious circulation currents. For the purpose of eliminating the effect of the spurious currents the portion of the transmission line exposed to the inductive effect setting up the said spurious circulation currents may compose a plurality of pairs of wires symmetrically disposed and interconnected in such a way that spurious circulation currents set up in any conductor of one pair of wires are balanced by the spurious circulation currents set up in the other wire of said pair of wires. Instead of utilizing a pair of wires the transmission lines may each comprise a plurality of wires symmetrically disposed, the wires being divided into groups, and the two groups being symmetrically disposed and also interconnected in a manner similar to the above mentioned pair of wires. This arrangement will be described later in more detail.

As illustrated in Fig. 2, an inductance may be introduced in series in the path of the longitudinal current by coiling up the wires of the transmission line. In order to form with said inductance a parallel resonant circuit lying in the path of the longitudinal currents an auxiliary circuit may be associated with the coiled portion of the transmission line, the said auxiliary circuit comprising impedance elements so arranged and adjusted that they form with the said coiled portion of the transmission line a parallel resonant circuit.

In Fig. 2, a condenser C is associated with the coiled portion L of a transmission line TL so as to form with said coiled portion a parallel resonant circuit lying in the path of the longitudinal currents which may be set up in the transmission line. The condenser C has its two terminals interconnected by means of a wire W lying in close proximity to the wires of the transmission line, all of the said wires being at least for a portion of their length coiled up so as to form at least one loop in the manner shown in Fig. 2. The coupling between the wires W and the two wires of the transmission line is very tight so that the capacity C is effectually associated with the coiled portion L and forms with it an anti-resonant circuit which is effectually in series in the circuit comprising the two wires of the transmission line connected in parallel.

It should be noted that the two wires of the transmission line TL are twisted together particularly in the coiled portion L of said transmission line. Obviously, the transmission line TL may consist of an even number of substantially parallel conductors which are associated with one or more other wires, such as W, each of which includes a tuning element such as a condenser C.

Figs. 3 to 5 show an improved transmission line TL, a portion of which at least is covered by means of a metallic tube $t$ or any other conductive layer such as wire-gauze, etc. The metallic tube $t$ extends over only the coiled portion of the transmission line L as illustrated on Fig. 3, but it may cover the whole of the transmission line TL. In order to tune the inductance formed by the coiled portion L of the transmission line, a condenser C is provided and interconnected between the two extremities of the metallic tubing t. One wire of the transmission line comprises the metallic tubing itself while the other wire is located inside said metallic tubing and isolated therefrom. The condenser C actually tunes only one wire of the transmission line TL but since the coupling through the coiled portion L of the transmission line is very tight, the second wire of the transmission line is practically tuned to the same frequency as the first mentioned wire.

In Fig. 4 there is shown a sectional view of a transmission line comprising a plurality of concentric tubes designated by the numerals 1, 2 and 3. Any one of these three conductors may have interconnected between the extremities of its coiled portion a tuning condenser, the two other free conductors being used as the wires of the transmission line.

In Fig. 5 there is shown a transmission line somewhat analogous to that shown in Fig. 3 but in which the two wires of the transmission line pass through a metallic tubing t. The tuning condenser C in this arrangement is connected between the two extremities of the metallic tubing t, and as explained above this condenser is used to constitute a tuned circuit with the inductance L of the coiled portion of the transmission line.

In the examples given above there is considered especially the case in which it is desired to attenuate greatly currents of one frequency, or of a narrow range of frequencies, set up in the wires of the transmission line but it should be noted that the principles above disclosed may likewise be adapted for currents extending over a wide range of frequencies. Moreover, instead of an inductance L of large dimensions, an inductance comprising low impedance lines placed at a small distance from each other or a plurality of concentric wires or lead covered wires may be employed.

It may be necessary in certain cases to provide devices for matching impedances at the input and output of the coiled portion L of the transmission line TL. These impedances may be rendered similar, however, by making the length of coiled portion L of the transmission line equal to $$\frac{K\lambda}{2},$$

K being an integral number and being the wavelengths corresponding to the circulation currents. It should be noted that $$\frac{\lambda}{2}$$

must be measured on the transmission line taking into account the speed of propagation of electricity in the said line.

It will be clear that a plurality of coiled portions L may be provided along the length of a transmission line TL in which case it may be necessary to provide means for preventing the formation of standing waves along the transmission lines, and this may be done by inserting a damping resistance of suitable value in which the oscillatory energy of the standing wave may be dissipated or by properly matching the impedance.

In Fig. 6 transmission line TL connects the two devices A and B. In order to protect the apparatus B against the influence of longitudinal disturbing currents, a portion of the transmission line TL is passed through a metallic tubing t which is coiled as shown in L and tuned to a desired frequency by means of a condenser C in a manner similar to that shown in Fig. 5. In order to provide additional protection against longitudinal disturbing currents a portion of the transmission line is passed through a metallic tube t' a portion of which is arranged in such a way that over a substantial surface of this metallic tubing all the points are substantially at the same potential. Preferably this potential is constant. To secure a constant potential, a portion of the metallic tubing t' is coiled in such a way that each consecutive loop of the coil L'L" is in electrical contact with the adjacent loop and this coiled portion is preferably wound on a conductive mandrel. Moreover, the coiled portion L'L" is preferably of small dimensions, particularly when this arrangement is used in a short wave signaling system, in order to insure an equipotential surface.

A constant potential may be applied to the coiled portion L'L", by connecting it to ground or to a screen S or, in the case of an installation comprising vacuum tubes to a point of the filament of one of said tubes.

It may be advantageous to have the tube t' cover the whole line from device A to coil L'L" and choose the electrical length of the metallic tubing t' so that this electrical length is equal to an integral multiple of half a wave-length of the circulation currents. However, this electrical condition is not necessary if there is provided in the line TL at the input of the coiled portion L'L" an impedance matching device.

The operation of the arrangement illustrated in Fig. 6 is as follows:

The longitudinal currents flowing in phase in the inner conductors enter the metallic tubing at F where a transmission loss takes place corresponding to the lack of impedance matching at this point. A portion of the path of these longitudinal currents comprises the two wires in parallel of the transmission line located in said metallic tubing t' and it will be seen that these longitudinal currents set up a current on the metallic tubing t' whose direction is opposite to that of the in-phase currents in the wires, so that the two wires of the transmission line TL inside the metallic tubing t' form in conjunction with the metallic tubing t' a transmission line for the longitudinal currents. When the longitudinal currents on the tube reach the coiled portion L'L" of the transmission line they will flow to earth since the surface of the metallic tubing t' is short-circuited and the electrical length of the ground lead is of the order of a wave-length. The longitudinal currents in the two wires will also flow to earth through the distributed capacity existing in the coiled portion L'L" between the two wires and the metallic tubing t'. Consequently, these longitudinal currents will not influence the terminal apparatus connected to the transmission line.

The various arrangements for reducing the effect of longitudinal currents illustrated in Fig. 6 may, of course, be employed either jointly or separately, or even in combination with other protecting arrangements.

Referring now to Fig. 7 there is connected in parallel between the two wires a and b of a transmission line TL subject to longitudinal currents an auxiliary circuit L'L" having a high admittance for the longitudinal currents without materially affecting the circulation currents flowing through the transmission line TL. The coiled portion L'L" is similar to the corresponding arrangement described in connection with Fig. 6, the only difference being that the free extremity E of the auxiliary transmission line is either short-circuited or open-circuited depending upon the electrical length chosen for the circuit comprising the coiled portion L'L''. The electrical length of the auxiliary transmission line depends upon the impedance value desired between the two extremities of the auxiliary transmission line TL. For example, this impedance may be made very large for the circulation currents by making the electrical length of the auxiliary transmission line an odd integral multiple of quarter wave-lengths and short-circuiting the free extremity E. Obviously, a number of such auxiliary transmission lines may be provided along the main transmission line TL.

Fig. 8 illustrates another auxiliary line having a high admittance to ground for the longitudinal currents. In this figure an auxiliary transmission line $ab$ is connected in shunt between the two wires of a main transmission line TL subject to longitudinal disturbing currents. The two wires $a$ and $b$ are twisted together as shown in Fig. 8. This line is also short-circuited at a distance equal to a quarter wave-length for the circulation currents for the purpose of obtaining a very high impedance looking into this auxiliary line for the circulation currents at point P. The short-circuited extremity of the transmission line is connected to ground so as to provide a path for the longitudinal disturbing currents.

Figure 9:
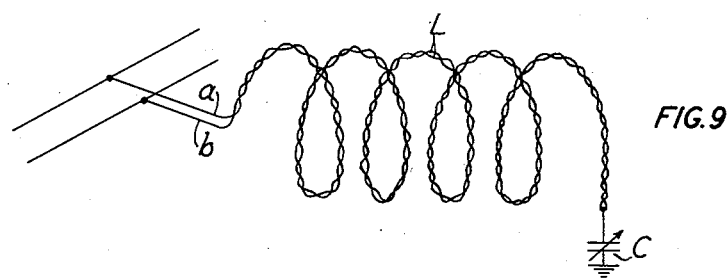

Referring to Fig. 9 it will be seen that the protecting effect of the auxiliary transmission line illustrated in Fig. 8 may be enhanced by coiling the said transmission line so as to form at least one loop. In this arrangement the short-circuited extremity of the transmission line is connected to ground through a condenser so as to form a series resonant path having a high admittance to the longitudinal currents. This system necessitates in certain cases the provision of screening means round the coiled portion L of the transmission line and the associated condenser, but the necessity of providing screening means for the coiled portion L of the auxiliary transmission line may be avoided, however, by utilizing the arrangement of Fig. 10.

Figure 10:
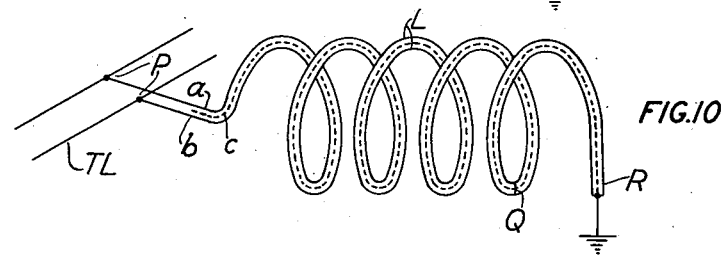

In Fig. 10 an auxiliary wire $c$ is included between the two wires of the auxiliary transmission line $ab$. For the sake of simplicity, the auxiliary transmission line $ab$ is illustrated by parallel wires, but in fact, the wires of the transmission line are twisted together in a manner similar to that shown in Figs. 8 and 9. The electrical length of the portion PQ is adjusted by short-circuiting the wires $a$ and $b$ at Q. The two wires of the transmission lines as well as the auxiliary wire $c$ are all short-circuited at a point R and connected to ground. The electrical lengths of the portion PQ equals an odd integral multiple of quarter wave-lengths for the circulation currents while the electrical length PQR equals an integral multiple of half wave-lengths of the longitudinal currents. This half wave-length auxiliary transmission line short-circuited at one of its extremities provides a path of high admittance for the longitudinal currents. The wire $c$ functions as a screen for the portion L of the auxiliary transmission line PR.

It will thus be seen that the arrangement in Fig. 10 is such that: the wires $a$ and $b$ are connected to the main transmission line TL at the input terminals of a device, such as the transmitter or receiver device A in Fig. 1. The third wire $c$ is connected to the screening arrangement of this apparatus in the vicinity of the input terminals of said apparatus. The auxiliary transmission line thus arranged may be wound on a suitable insulating form so as to reduce the bulk of the arrangement, and the whole may be placed inside a suitable screen such as a metal box in order to protect it against extraneous influences.

Figure 11:
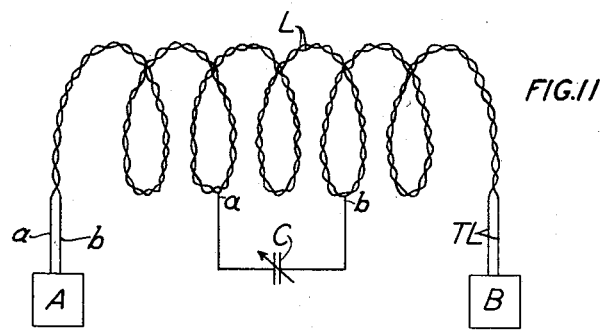

Fig. 11 illustrates an auxiliary twisted transmission line arranged so as to form one or more loops. In order to form with the inductance of the coiled portion L of the auxiliary transmission line a parallel resonant circuit located in series in the path of the longitudinal currents, one terminal of the adjustable condenser C is connected to wire $a$ of the transmission line TL and the other terminal is connected to wire $b$ the path of the longitudinal currents comprising the two wires $a$ and $b$ being in parallel.

In Fig. 12 an arrangement is illustrated comprising a shunt and a series element which, as indicated before, form a current discriminator. In this figure a main transmission line TL connects the two devices A and B, and an auxiliary transmission line $T_1L_1$ and an auxiliary wire $c$ are associated with this main line. The wire $c$ is connected to ground at both of its extremities while the free end only of the transmission line $T_1L_1$ is connected to ground. The length QS of the auxiliary line $T_1L_1$ is equal to an integral multiple of half a wave-length for the longitudinal currents, that is $$\frac{\lambda_1}{2},$$

where $\lambda_1$ is the wave-length of the longitudinal currents. Since the auxiliary transmission line $T_1L_1$ is grounded at S, the impedance at Q for longitudinal currents is very low, that is, substantially zero. The length PQ of the main line TL is equal to an odd integral multiple of a quarter wave-length for the longitudinal currents. Since the impedance at Q is at the most equal to the impedance due to the line QS which is very low at Q, the impedance at P for the longitudinal currents will be very high, that is, substantially infinite. The wires $a$ and $b$ of the auxiliary transmission line $T_1L_1$ are short-circuited at a point R such that the distance QR is equal to an odd integral multiple of quarter wave-lengths of the desired circulation currents which distance is designated $$\frac{\lambda_2}{4},$$

where $\lambda_2$ is the wave-length of the circulation currents.

It will be observed that in the system of Fig. 12, the shunt element QS corresponds to that shown in Fig. 10 and in addition a series element PQ constituted by means of transmission lines is included in the system of Fig. 12. These series and shunt elements which form a discriminator may, of course be associated in numerous different ways.

Figs. 13 and 14 are diagrammatic representations of the system of Fig. 12, Fig. 13 corresponding to that of Fig. 12 in so far as longitudinal currents are concerned and Fig. 14 corresponding in so far as circulation currents are concerned. In Fig. 13 the impedance Z represents the high impedance of the series element PQ and Y represents the high admittance of the shunt element QS. In Fig. 14 the impedance Z' represents the high impedance of the portion QR of the shunt element QS. The discriminator may have one or more sections, each section comprising either or both the shunt and series elements described above. The system of Fig. 12 is an example of a discriminator having one section including both a shunt and a series element, and the system of Fig. 15 is an example of a discriminator having two sections, each comprising both types of elements.

Referring to Fig. 15 the two devices A and B are connected by means of a main transmission line TL, and two auxiliary transmission lines $T_1L_1$ and $T_2L_2$ are associated with this main transmission line. The transmission lines TL and $T_1L_1$ are each similar to the one described in connection with Fig. 12. The only difference between the systems of Figs. 12 and 15 lies in the provision in the latter of a second auxiliary transmission line $T_2L_2$ bridged at $Q_1$ on the main transmission line TL. The length $Q_1S_1$ of the auxiliary transmission line $T_2L_2$ is substantially equal to an integral multiple of a half wave-length for the longitudinal currents and the length $Q_1Q$ is substantially equal to an integral multiple of a quarter wave-length for the longitudinal currents. Since the transmission line $T_2L_2$ is grounded at $S_1$ for longitudinal currents, the impedance at $Q_1$ for longitudinal currents is very low and at Q very high, the apparatus B being connected at $Q_1$.

The operation of the circuit of Fig. 15 may be best understood with reference to Figs. 16 and 17 which represent circuits corresponding to the circuit of Fig. 15 respectively for the longitudinal and circulation currents.

In Fig. 16, $Z_1$ and $Z_2$ are the high impedances for longitudinal currents of the series elements PQ and $QQ_1$ and $A_1$ and $A_2$ are the high admittances for these currents of the shunt elements QS and $Q_1S_1$. In Fig. 17, $Z_1'$ and $Z_2'$ represent the high impedance for circulation currents of the shunt elements QR and $Q_1R_1$.

Figure 18:
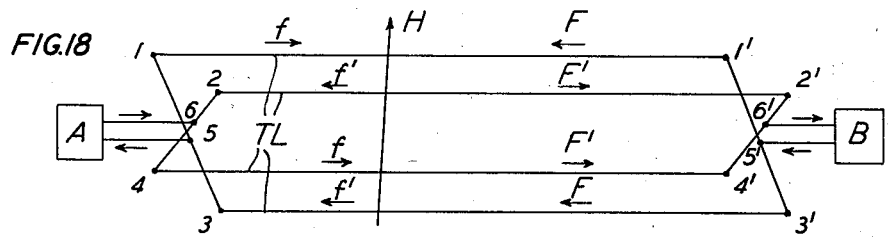
Fig. 18 shows a transmission circuit adapted to reduce the influence upon terminal apparatus of spurious circulation currents set up in a transmission circuit.

In Fig. 18 a system for balancing out the spurious circulation currents which may be set up in the transmission line is shown which is quite different from that of Fig. 10. In Fig. 18 the transmission line TL comprises a plurality of conductors 1, 1'; 2, 2'; 3, 3' and 4, 4' symmetrically disposed with respect to a disturbing field H which may be variable both in amplitude, in frequency, and in direction. This disturbing field produces in the conductors 1, 1'; 2, 2'; 3, 3' and 4, 4' spurious circulation currents flowing, for instance in the directions indicated by the arrows f and f'. It will be seen that in the wires 1, 1' and 3, 3' the spurious currents flow in opposite directions, and likewise in the wires 2, 2' and 4, 4'. If the distance between the wires 1, 1' and 3, 3'; 2, 2' and 4, 4' is small as compared to the wave-length of the disturbing field H, the spurious circulation currents flowing for instance in the wires 1, 1' and 3, 3' will be substantially equal and of opposite phase. If the wires 1, 1' and 3, 3' are interconnected in the manner shown in Fig. 18, these spurious circulation currents will balance out in the wires connecting A and B and to points 5 and 5' respectively. Likewise, the spurious circulation currents induced in the two wires 2, 2' and 4, 4' will balance out in the wires connecting A and B with points 6 and 6' respectively. The points 5 and 6 (and 5' and 6') are at the same potential as far as the spurious circulation currents are concerned. It will be clear, therefore, that only the useful circulation currents transmitted for instance from device A will affect device B, since these useful circulation currents flow in the wires 1, 1'; 2, 2'; 3, 3' and 4, 4' in directions indicated by the arrows F and F' and the corresponding currents in the two wires 1, 1' and 3, 3' for instance will add together at point 5. Instead of an arrangement utilizing only 4 wires as in Fig. 18, a greater number of wires may be employed and placed at the corners of a polygon instead of a square as illustrated in Fig. 18.

In Fig. 19 an arrangement embodying features of the invention as applied to a radio signaling system is illustrated. Reference letter B designates a directional antenna and letter A a receiver, the antenna being coupled by transformer Tr to the transmission line TL which is exposed to the incoming field impinging on the antenna B. The transmission line TL picks up incoming signals as well as the antenna B, thus disturbing the directional effect of the antenna B. In the transmission line TL the series element Z and the shunt elements $Y_1$ and $Y_2$ which elements are illustrated schematically but may be similar to those described in detail above, are provided for the purpose of reducing considerably the pick-up of the signals by the transmission line TL, and therefore of improving the directivity of the antenna. Such an arrangement increases the ratio of signal to noise for the receiving system. The devices $Y_1$ and $Y_2$ of Fig. 19, like the device Y of Fig. 13, represent shunt admittances for the longitudinal currents without grounding the circulating signal currents, as illustrated in Figs. 6 to 10, 12 and 15; while the device Z, like the device Z in Fig. 13, represents a series impedance for the longitudinal currents without adding appreciable loss for the circulating signal currents, as illustrated in Figs. 2 to 6, 12 and 15.

Since certain of the arrangements described above provide a low impedance path for the longitudinal currents which may be introduced in the signaling circuit without substantially affecting the signaling currents, it will be possible to provide such low impedance path for the currents set up by a particular source of disturbances such as a nearby transmitter or other sources of disturbances. This may be particularly useful when a radio transmitter is located in the vicinity of the receiver.

The arrangements described above are capable of other applications than disturbance prevention. For example, it is possible with such arrangements to receive simultaneously or not signals from two different stations on the same antenna system, the reception from one of the stations being directional and from the other non-directional. In such a case, the directional currents will use the path of the circulation currents discussed above, and the non-directional currents the path of the longitudinal currents. The directional and non-directional receptions may be for the same or different wave-lengths. Since the line is in effect a single conductor for the longitudinal, that is, for the non-directional currents it may be convenient to connect the grid of the first valve of the receiver to the wires of the line soldered together at a distance equal to an odd integral multiple of a quarter wave-length from the auxiliary transmission line extremity which is connected to ground.

The arrangements described above may also be employed with advantages in the case of radio transmitters in which case the sending antenna radiation affects the currents in the feeding transmission line and therefore the value of the currents outgoing from the sending station.

Certain of the arrangements described above, such as for instance the one of Fig. 14, may be designed so as to have a high admittance looking from the antenna for longitudinal currents, and advantages may be derived from this property of the arrangement. Supposing a static charge induced in the antenna system for instance, by an atmospheric disturbance, this charge will flow to earth through a low impedance path, and therefore it will set up a low voltage across the input terminals of the signaling apparatus. On the contrary, if the impedance to ground is high, the voltage set up by the same static charge will be higher and the disturbing effect on the signaling apparatus will be greater.

Although the invention has been described in connection with specific arrangements it is obvious that other arrangements may be employed and the various features may be successfully applied in low frequency as well as in radio or carrier transmission systems without exceeding the scope of the invention.

What is claimed is:

1. In combination, a main transmission line conveying in-phase currents of one frequency and oppositely-phased currents of another frequency, a plurality of auxiliary lines each equal in length to a half wave-length or a multiple thereof of said in-phase currents and having one end short-circuited and grounded, said auxiliary lines being bridged across the main line at points spaced a quarter wave-length or an odd multiple thereof of said in-phase currents, each auxiliary line being short-circuited at a point located a quarter wave-length or an odd multiple thereof of said oppositely-phased currents from said main line, a plurality of conductors each equal in length to an odd multiple of a quarter wave-length of the in-phase currents, one of the conductors being connected to the grounded end of one auxiliary line and another of said conductors being connected to the grounded end of another auxiliary line, and a utilization circuit connected to the line at one pair of the first mentioned points.

2. In combination, a transmission line conveying in-phase currents of one frequency and oppositely-phased currents of another frequency, a current discriminator connected thereto and comprising a shunt admittance and a series impedance for the in-phase currents, said shunt admittance comprising an auxiliary line having a length equal to a half-wave length, or a multiple thereof, of said in-phase currents, said auxiliary line having one end connected across the main line and its other end short-circuited and grounded, said auxiliary line being short-circuited at a point located a quarter wave length or an odd multiple thereof of the oppositely-phased currents from the main line, said series impedance comprising a conductor positioned parallel to said auxiliary line and to a portion of said transmission line, said conductor having a length equal to a quarter wave length or an odd multiple thereof of the in-phase currents and its terminals connected to ground.

3. In combination, a main transmission line comprising a plurality of conductors, a current discriminator comprising a shunt admittance and a series impedance, said shunt admittance comprising an auxiliary line connected between said main line and the ground, said series impedance comprising similar portions of each of the main line conductors and an additional conductor disposed in parallel relation and cooperating with said portions, the admittance having a value such as to impede the flow of desired currents while permitting flow of undesired currents and the impedance having a value such as to impede the flow of undesired while permitting the flow of desired currents.

4. In combination, a main transmission line comprising a plurality of conductors, a current discriminator comprising a shunt admittance and a series impedance, said shunt admittance comprising an auxiliary line connected between said main line and the ground, said series impedance comprising similar portions of each of the main line conductors and an additional conductor disposed in parallel relation and connected with each of said portions, the admittance having a value such as to impede the flow of desired currents while permitting flow of undesired currents and the impedance having a value such as to impede the flow of undesired while permitting the flow of desired currents.

5. In combination, a main transmission line comprising a plurality of conductors conveying in-phase currents of one frequency and oppositely-phased currents of another frequency, a current discriminator comprising a shunt admittance and a series impedance, said shunt admittance comprising an auxiliary line connected between said main line and the ground, the electrical value of said shunt admittance being such as to permit the flow of the in-phase currents while impeding the flow of the oppositely-phased currents, said series impedance comprising similar portions of each main line conductor and an additional conductor connected to ground at both its extremities and having a value such as to impede the flow of the in-phase currents while permitting the flow of the oppositely-phased currents.

6. In radio transmission, a transmission line comprising a plurality of conductors, shunt admittance means having a shunt conductive connection of constant potential and adapted to permit the flow thereinto of the undesired currents in said conductors while impeding the flow thereinto of the desired currents in said conductors, and series impedance means comprising similar lineal portions of said plurality of conductors and an additional conductor connected to ground at both its extremities and cooperating with said plurality of portions for impeding the flow of the undesired currents in said portions.

7. In radio transmission, a transmission line comprising a plurality of conductors, shunt admittance means comprising an auxiliary line having one portion connected in shunt with said conductors and having another portion short-circuited at constant potential and adapted to permit the flow thereinto of the undesired currents in said conductors while impeding the flow thereinto of the desired currents in said conductors, and series impedance means comprising similar lineal portions of said plurality of conductors and an additional conductor conductively connected with and disposed parallel to said plurality of lineal portions for impeding the flow of the undesired currents in said lineal portions.

8. In a radio signaling system, a transmission line comprising a plurality of conductors, an auxiliary line having one end connected in shunt relation with said conductors of said transmission line and having its other end short-circuited and having a length between said ends equal to a half-wave length, or an integral multiple thereof, of the undesired currents in said conductors and having another short-circuiting connection disposed a distance from said transmission line equal to a quarter-wave length, or an odd multiple thereof, of the desired currents in said transmission line, and an additional conductor connected with and disposed parallel to said transmission line conductors and having a length equal to a quarter-wave length, or an odd multiple thereof, of the undesired currents in said transmission line.

9. Apparatus for reducing or eliminating longitudinal currents in a high frequency transmission line comprising means coupled in shunt relation with the plurality of said line conductors for draining said longitudinal currents from said line, while impeding the flow of useful currents therefrom, and means including an additional conductor disposed in parallel relation with the plurality of said line conductors and having a resonant length with respect to the wave-length of said longitudinal currents for impeding the flow of said longitudinal currents in said line.

10. In radio transmission, a transmission line, and an auxiliary line therefrom to ground having such critical length with respect to the wave-length of waves of an undesired frequency as to readily permit said waves of undesired frequency to flow to ground and a connection operatively bridging said auxiliary line at such critical length from said transmission line as to exclude waves of a desired frequency.

11. A high frequency system including a main line and an auxiliary line having one end operatively connected therewith, said auxiliary line having an entire length substantially equal to a multiple of a half wave-length of waves of one frequency and having an operatively short-circuiting connection at a length from said main line substantially equal to a multiple of a quarter wave-length of waves of another frequency.

12. In combination, a main transmission line conveying in-phase currents and oppositely-phased currents, a plurality of auxiliary lines each equal in length to a half wave-length or a multiple thereof of said in-phase currents and having one end short-circuited and grounded, said auxiliary lines being bridged across the main line at points spaced a quarter wave-length or an odd multiple thereof of said in-phase currents, each auxiliary line being short-circuited at a point located a quarter wave-length or an odd multiple thereof of said oppositely-phased currents from said main line, a plurality of conductors comprising with said main transmission line conductors, circuits for said in-phase currents, and each being equal in length to an odd multiple of a quarter wave-length of the in-phase currents, one of the conductors being connected to the grounded end of one auxiliary line and another of said conductors being connected to the grounded end of another auxiliary line and a utilization circuit connected to the line at one pair of the first mentioned points.

13. In combination, a transmission line conveying in-phase currents and oppositely-phased currents, a current discriminator connected thereto and comprising a shunt admittance and a series impedance for the in-phase currents, said shunt admittance comprising an auxiliary line having a length equal to a half-wave length, or a multiple thereof, of said in-phase currents, said auxiliary line having one end connected across the main line and its other end short-circuited and grounded, said auxiliary line being short-circuited at a point located a quarter wave-length or an odd multiple thereof of the oppositely-phased currents from the main line, said series impedance comprising a conductor positioned parallel to said auxiliary line and to a portion of said transmission line, said conductor having a length equal to a quarter wave-length or an odd multiple thereof of the in-phase currents and its terminals connected to ground.

14. In combination, a main transmission line comprising a plurality of conductors, a current discriminator comprising a shunt admittance and a series impedance, said shunt admittance comprising an auxiliary line connected between said main line and the ground, said series impedance comprising similar portions of each of the main line conductors and an additional conductor disposed in parallel relation and cooperating with said portions, the admittance having a resonant value such as to impede the flow of desired currents while permitting flow of undesired currents and the impedance having a resonant value such as to impede the flow of undesired while permitting the flow of desired currents.

JULIEN J. B. LAIR.
GEORGES E. M. PERROUX.